(12) United States Patent
Poskanzer

(10) Patent No.: US 6,763,361 B1
(45) Date of Patent: Jul. 13, 2004

(54) OBJECT-ORIENTED DATABASE ABSTRACTION AND STATEMENT GENERATION

(75) Inventor: Harold Poskanzer, Palo Alto, CA (US)

(73) Assignee: Opsware, Inc., Sunnyvale, CA (US)

( * ) Notice: Subject to any disclaimer, the term of this patent is extended or adjusted under 35 U.S.C. 154(b) by 113 days.

(21) Appl. No.: 09/699,348

(22) Filed: Oct. 31, 2000

(51) Int. Cl.$^7$ .............................................. G06F 17/30
(52) U.S. Cl. ................... 707/103 R; 707/104.1
(58) Field of Search ..................... 707/1, 4, 10, 104.1, 707/102, 103 R; 716/11

(56) References Cited

U.S. PATENT DOCUMENTS

| | | | | |
|---|---|---|---|---|
| 5,937,409 | A | * 8/1999 | Wetherbee | 707/103 R |
| 6,061,689 | A | 5/2000 | Chang et al. | 707/103 R |
| 6,073,129 | A | 6/2000 | Levine et al. | 707/4 |
| 6,249,903 | B1 | * 6/2001 | McSherry et al. | 716/11 |
| 6,279,008 | B1 | 8/2001 | Tung Ng et al. | 707/102 |
| 6,366,921 | B1 | * 4/2002 | Hansen et al. | 707/103 |

* cited by examiner

Primary Examiner—Diane D. Mizrahi
Assistant Examiner—Apu Mofiz
(74) Attorney, Agent, or Firm—Burns, Doane, Swecker & Mathis, L.L.P.

(57) ABSTRACT

An interface provides a level of abstraction between the structure of a database system and application programs which access that system. The database system is represented by a model comprised of objects which correspond to the components of the database system. An object at a higher level encapsulates information contained in these other objects regarding the structure of the database. Whenever an application program requires access to the database, it sends a message to the higher level encapsulation object. The lower-level objects implement methods which automatically generate appropriate database commands. When the encapsulation object receives a call from an application program requesting data in the database, it instructs table objects to obtain the required data. In response, the table objects invoke field objects to identify how to represent data in each of the database fields to which they correspond. The table object concatenates the responses received from each of the field objects to construct a command that is presented to the database to retrieve the desired data.

13 Claims, 3 Drawing Sheets

OBJECT-ORIENTED DATABASE ABSTRACTION AND STATEMENT GENERATION

FIELD OF THE INVENTION

The present invention is generally directed to database systems, and more particularly to an interface for database systems that facilitates the interaction of external application programs with a database system.

BACKGROUND OF THE INVENTION

In a number of different situations, it is useful for an application program to be able to retrieve data from a database, and/or update data in the database. Currently, many such programs are written in an object-oriented programming language, such as Java, which sends messages from one object to another to effect operations. In contrast, most database programs are written in other types of programming languages, and therefore are not adapted to respond to the messages sent by object-oriented programs. The database programs employ commands that have a predetermined structure which must be utilized to manipulate data in the database. One particularly prominent example of a programming language which has such a requirement is the Structured Query Language (SQL) for relational databases that are comprised of tables.

In order for an application program to be able to access data in a database, therefore, it is necessary for the program to include functionality which enables it to generate commands that are appropriate to the database being accessed. Hence, if a SQL database program is to be accessed, the application program must be capable of generating SQL data manipulation statements to send to the database. Typically, this functionality is provided by directly coding it into the application program itself. However, such an approach is undesirable for a number of reasons. First, it requires the programmer who is writing the application program to have familiarity with the database programming language, such as SQL. In addition, the programmer must have knowledge about the structure of the particular database to be accessed, e.g how the data is arranged in the various tables. This can impose a significant burden on the development of the application program since, if the programmer is not versed in the database programming language, or familiar with the structure of the database, errors are likely to arise, resulting in a considerable debugging effort.

Secondly, if the structure of the database is changed, the application program may no longer be able to access the data. For instance, one table in the database may be split into two or more tables. If the application has been coded to address the prior single table, it will not be able to generate the appropriate commands to access the two new tables. In such a case, it becomes necessary to rewrite the application program to enable it to work with the restructured database. It can be seen that such an approach is unacceptable, particularly if the database is one which is susceptible to having its structure modified from time to time to accommodate new data.

It is desirable, therefore, to provide a system and method for automatically generating database statements from messages generated by application programs, which avoids the need to have database functionality hard-coded into the application program itself. It is further desirable to implement such a system and method in a manner which eliminates reliance by the application program on the structure of the database, thereby enabling the database to be modified without requiring changes in the application program.

SUMMARY OF THE INVENTION

In accordance with the present invention, an interface provides a level of abstraction between the structure of a database system and application programs which access that system. The database system is represented by a model comprised of objects which correspond to the components of the database system, e.g. tables and fields within the tables. An object at a higher level encapsulates information contained in these other objects regarding the structure of the database. Whenever an application program requires access to the database, it sends a message to the higher level encapsulation object. This object then presents the message to appropriate ones of the lower-level objects. By isolating the existence of the lower level objects from the application programs through the higher-level encapsulation object, changes can be made to the structure of the database without affecting the operation of the application programs.

As a further feature of the invention, the lower-level objects implement methods which automatically generate appropriate database commands. When the encapsulation object receives a call from an application program requesting data in the database, it instructs table objects to obtain the required data. In response, the table objects invoke field objects to identify how to represent data in each of the database fields to which they correspond. The table object concatenates the responses received from each of the field objects to construct a command that is presented to the database to retrieve the desired data.

Thus, by presenting a layer of abstraction between a database system and application programs, and by automatically generating database commands in response to messages from the application programs, the present invention provides flexibility in the interaction between the programs and the database system, and eliminates the need to hard-code database functionality into the programs. Further features of the invention, and the advantages provided thereby, are described in detail hereinafter with reference to exemplary embodiments illustrated in the accompanying drawings.

DETAILED DESCRIPTION

The present invention is directed to an interface for automatically generating statements that effect operations in a database, from received messages that are associated with object-oriented programs, such as remote procedure calls or remote method invocation. To facilitate an understanding of the invention, it will be described hereinafter with particular reference to an exemplary embodiment in which the automatically generated statements conform to the Structured Query Language (SQL) standard for databases. It will be appreciated, however, that the practical applications of the invention are not limited to this particular embodiment. Rather, the principles which underlie the invention can be applied to the generation of statements for any type of database.

Figure 1:
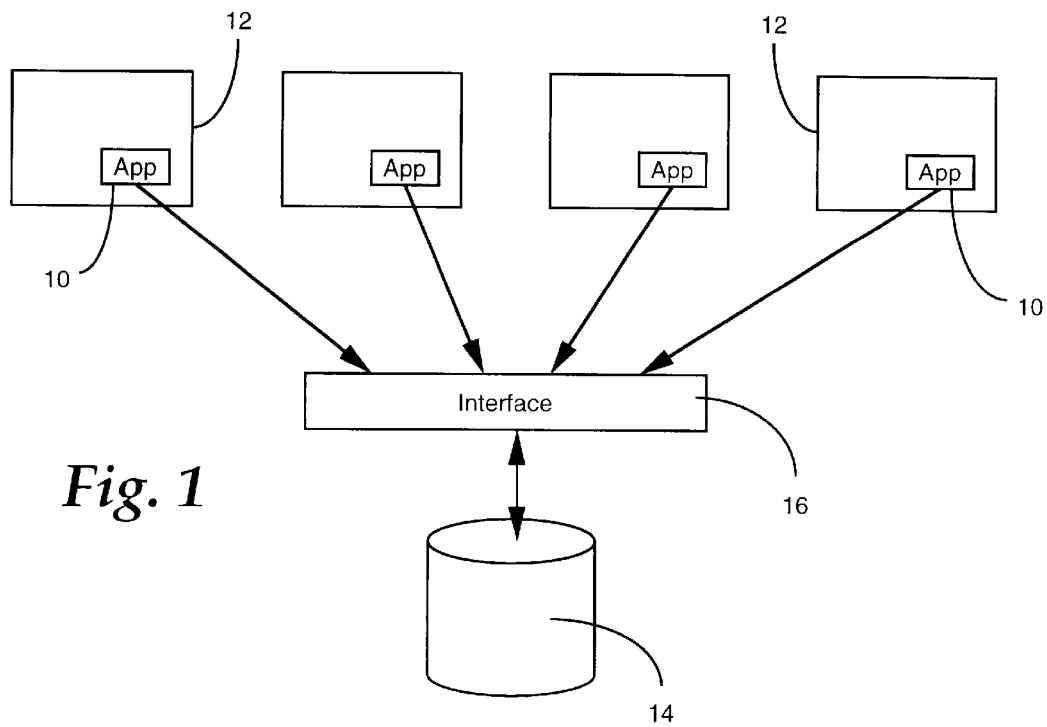
FIG. 1 is a block diagram of an exemplary system in which the present invention can be implemented.

One example of a situation in which the present invention can be employed is depicted in FIG. 1. In this case, application programs 10 executing on computers 12 require information from a database 14 to perform various tasks. For instance, the computers 12 may be web servers, and the programs 10 function to configure the servers to optimize their performance. To do so, the programs 10 obtain configuration parameter values from the database 14. If the database is an SQL database, the values are obtained by sending SQL statements to the database, requesting it to retrieve the appropriate data. Similarly, the programs 10 may instruct the database to store values relating to the current configurations of the computers 12. A more detailed description of an exemplary system of this type, in which the principles of the present invention can be employed, are described in application Ser. No. 09/699,329, filed on an even date herewith, the disclosure of which is incorporated herein by reference.

Figure 2:
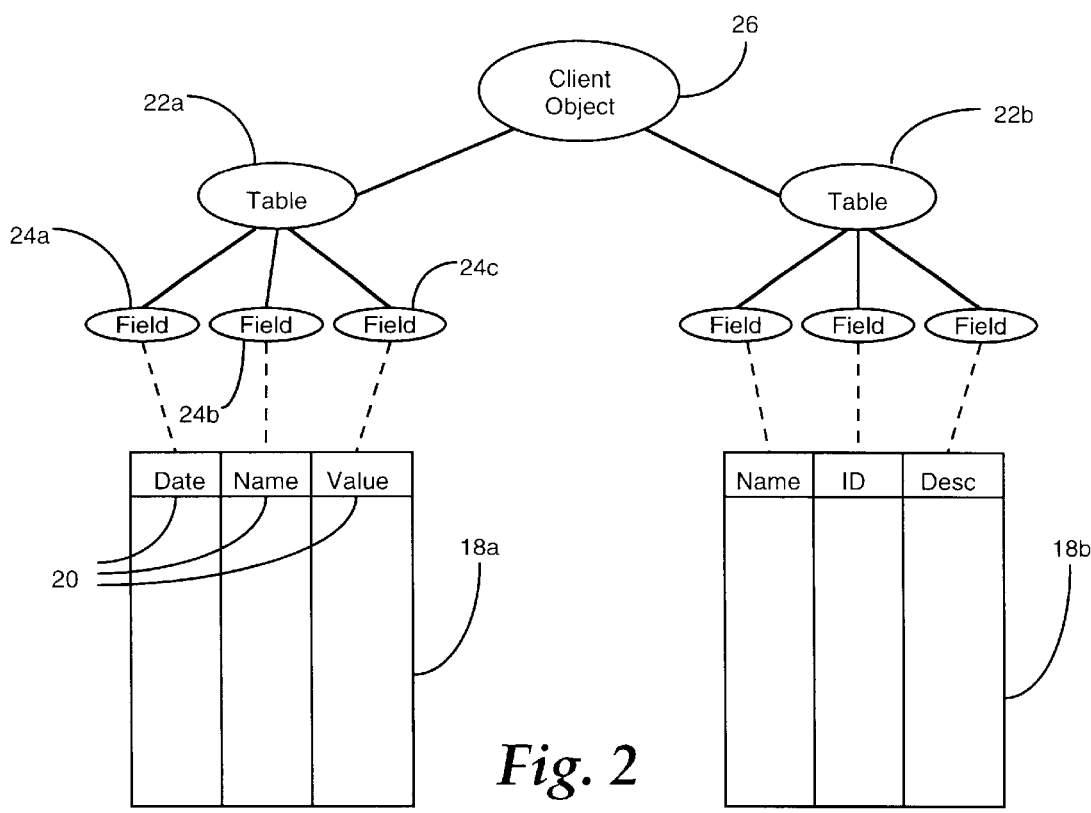
FIG. 2 is a diagram illustrating the relationship between database tables and an object-based model of the database.

Rather than communicate directly with the database 14, the application programs send messages to an interface or gateway 16. The interface operates to convert the messages from the program 10 into the appropriate commands. If the database 14 is an SQL database, the interface generates SQL statements for retrieving and/or inputting the required data. To do so, the interface contains an object-based model of the database. Referring to FIG. 2, a database typically comprises one or more tables 18a, 18b. Each table contains one or more columns or fields 20, which define the different types of information stored in the database. For instance, one field may contain a date value, another may contain a name value, i.e. a text string, and another may contain a numerical value, e.g. a configuration parameter. The type of field determines how an SQL statement must be structured to access data relating to that field. For instance, a date field is represented with a different format from a text string or a fixed length numerical field.

The model of the database comprises different classes of objects which are associated with respective components of the database. In the example of FIG. 2, the model contains two table objects 22a and 22b, which respectively correspond to the tables 18a and 18b. Another class of object is a field object. Each table object links to a field object 24 for each field in the table. Thus, in the model of FIG. 2, the table object 22a links to three field objects 24a–24c, which correspond to the "Date", "Name" and "Value" fields in the table 18a.

Having a different object for each field enables a different method to be performed with respect to each field. In the context of the present invention, one of the methods that is performed by each field object 24 is to provide information which identifies how its associated field in the database is to be represented in a database command, e.g. an SQL statement. Hence, a method invoked on field object 24a indicates how the "Date" field is represented, whereas the same method invoked on field object 24b responds with an indication of the manner in which the "Name" field is represented. For example, if the "Name" field is of the text string type, when the field object 24b is fed a parameter value "xyz" it may respond with the result 'xyz', since this is how a text string is represented in an SQL statement. If the field object 24a is fed a value Oct. 31, 2000, it may respond with the result TO_DATE ('001031', 'YYMMDD'), since an SQL date value requires formatting information as well as the value itself.

Figure 3:
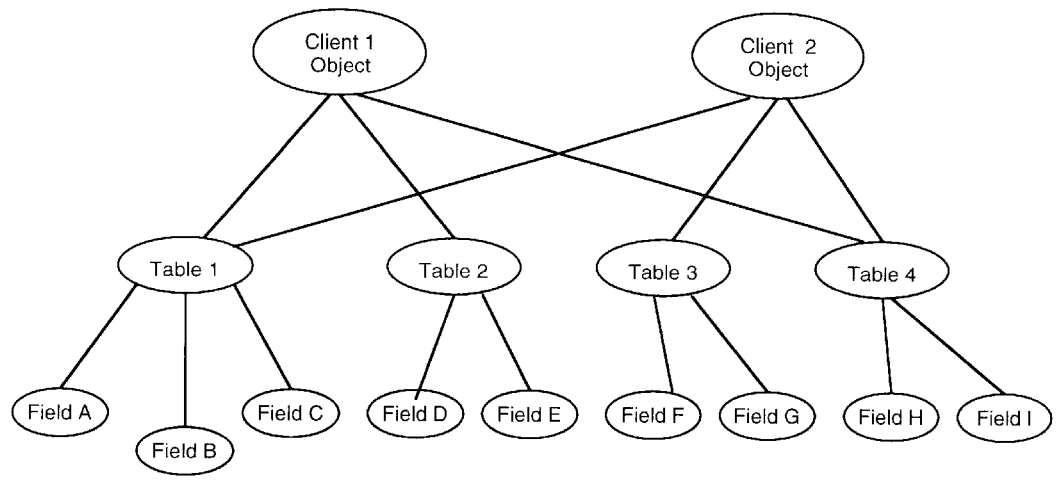
FIG. 3 is a diagram illustrating an exemplary model for a database.

In addition to the table objects 22 and the field objects 24, the object model of the database includes a higher-level object 26, identified as a client object. This object provides an abstraction of the database schema, and constitutes the destination of messages sent by application programs which call for access to the database. In the model, therefore, field objects 24 are grouped into tables, and the client object encapsulates one or more table objects. Different client objects can encompass different table objects, and hence different field objects. For instance, FIG. 3 illustrates an example in which the object for Client 1 is linked to tables 1, 2 and 4, whereas the object for Client 2 is linked to tables 1, 3 and 4. Hence, programs which call upon Client 1 can access the data in fields A, B, C, D, E, H and I, but not fields F and G. Conversely, programs which call upon Client 2 can access data in fields A, B, C, F, G, H and I, but not fields D and E.

Figure 4:
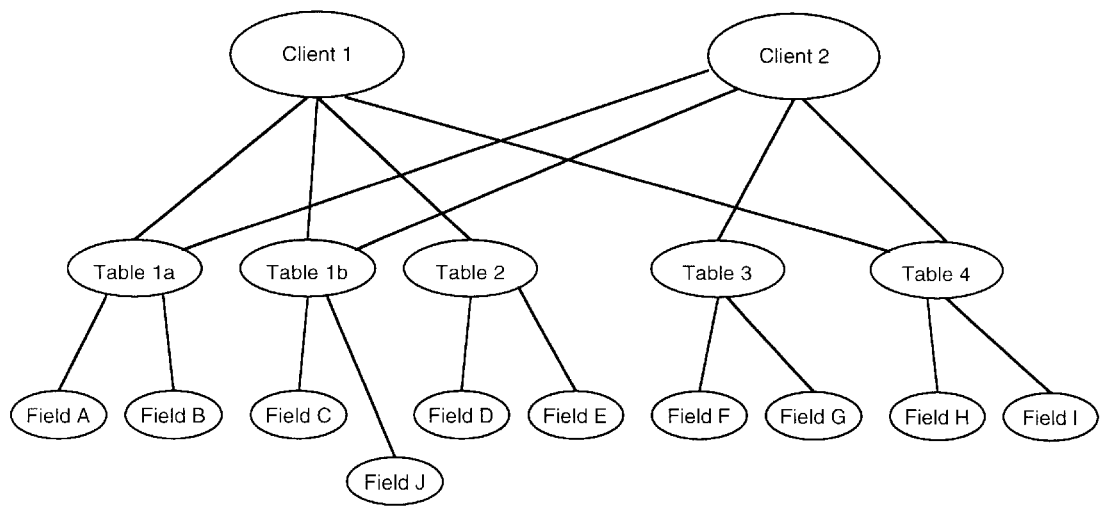
FIG. 4 is a diagram illustrating a modification of the model of FIG. 3.

The client objects 26 contain information regarding the fields that are present in the database, and can readily accommodate changes to its structure. For instance, table 1, which contains fields A, B and C, may be divided into two tables 1a and 1b, one of which contains fields A and B, and another of which contains field C and a new field, J, as shown in FIG. 4. If an application were to attempt to directly access field C via table 1 after such a change, it would be unsuccessful. However, by providing a level of abstraction through the auspices of the client object 26, such a result can be avoided. When an application requests data from field C, the client objects are aware of the fact that it is now grouped with the new table 1b, and call upon its table object to obtain the necessary data.

In operation, when an application program 10 needs to access the database, it issues a procedure call to the interface 16, identifying the particular items that are desired. For instance, the procedure call may indicate that the value of a parameter is desired for device having the name XYZ. This call is presented to a client object 26. In response, the client object calls upon each of the table objects 22 to which it is linked. Each table object invokes a method on its associated field objects 24, instructing them to identify how their corresponding fields are represented in the appropriate type of SQL statement. Thus, in the example illustrated in FIG. 2, the table object 22a invokes the field object 24a to indicate how the "Date" field is represented as a null value, and invokes the field object 24b to indicate how the "Name" field is represented in a WHERE clause, and invokes the field object 24c to indicate how the "Value" field is represented in a SELECT clause.

Once the responses are returned from the field objects, the table object 22 concatenates all of the results to form an SQL statement. This statement is then presented to the database 14. In response, the database returns the requested values, which are then forwarded to the application program 10 that made the call.

In addition to identifying the manner in which their respective fields are represented in a statement, the field objects can perform other operations that are appropriate to the generation of a statement. One such operation is the formatting of values. For instance, the application program 10 may use long integers, e.g 32-bit values, to represent floating point numbers, whereas numbers may be stored in the database as text strings. In this case, the field objects associated with string field types can convert the long integers into strings for representation in the database statement.

Figure 5:
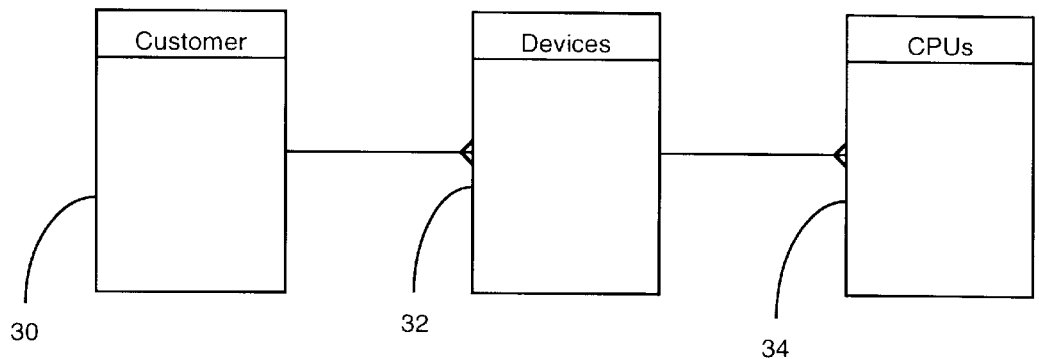
FIG. 5 is an illustration of three related tables in a database.

Another advantage associated with the use of the object-based model for the database is that it can be employed to identify relationships between the tables of the database. FIG. 5 illustrates an example of three tables in a database. A first table 30 named "Customers" identifies entities that have computing devices assigned to them, e.g. web site hosts or customers in a data center. A second table 32 named "Devices" has a many-to-one relationship to the Customers table 30, and indicates which computing devices are assigned to which entities. A third table 34 named "CPUs" has a many-to-one relationship to the Devices table 32, and identifies which CPUs are located in which devices.

Figure 6:
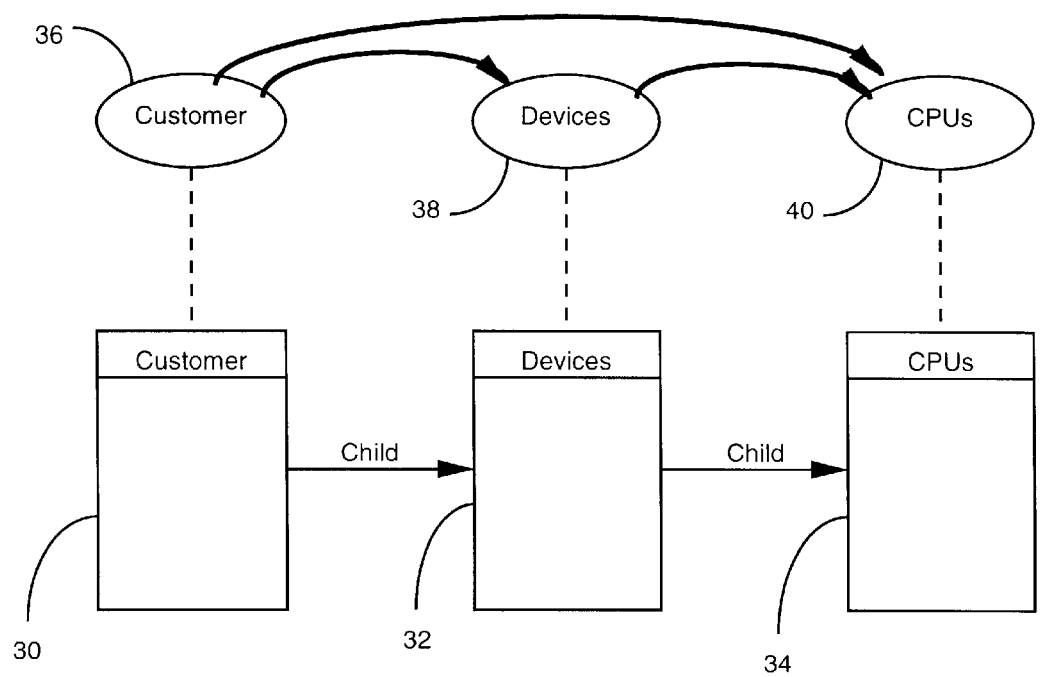
FIG. 6 is an illustration of the model for the tables of FIG. 5.

Each table has an object associated with it, as depicted in FIG. 6. Each such object can have an attribute which identifies other objects whose corresponding tables have a parent-child relationship with its associated table. Thus, in the example of FIG. 6, the object 36 for the Customer table 30 has an attribute which indicates that the object 38 for the Devices table is a child of the Customer object. In addition, it has an attribute which identifies the CPUs object 40 as another child, to thereby indicate that there is a relationship between the Customer table 30 and the CPUs table 34. A particular advantage to including relationship data in the objects is the fact that it permits database manipulation statements to be constructed in an efficient manner. More particularly, when a request is presented to obtain all devices assigned to a specific customer, the instance of the customer object 36 for the given customer can directly interrogate all of the device objects 38 that are related to it, and obtain the requested information from them. Furthermore, if the request should instead ask for all CPUs assigned to the customer, the customer object 36 can go directly to the CPUs objects 40, since one of its attributes identifies their relationship to the the customer object. In other words, the customer object 36 does not need to indirectly obtain the requested data through the intermediary devices object 38. Rather, it can directly call upon each of the related CPUs objects 40 to identify the CPUs associated with the customer.

Inclusion of the relationships within the objects provides for greater data abstraction and ease of use. In the foregoing example, customer objects can retrieve CPU data without having to construct an SQL statement that joins different tables, and can therefore be complicated. Rather, a much simpler command directed to one table can be used. The relationship information also enables a database administrator to insert one or more tables between the Customer and Devices tables, e.g. Device Groups, without affecting the ultimate users, i.e. the application programs 10.

From the foregoing, therefore, it can be seen that the present invention provides a technique for automatically generating a statement that is appropriate to the language of a database, for gaining access to information in the database. This technique alleviates the need for application programmers to know the structure of the database, or even the particular requirements of the database statements. Rather, this functionality is incorporated into the objects that constitute the model of the database. Hence, the application program need only communicate with the objects of the model in a conventional manner, e.g. by procedure calls or remote method invocation.

In the foregoing example, the automatic database statement generation is disclosed as taking place within an interface that is separate from the computers 12 on which the application programs 10 are running. It will be appreciated, however, that this capability can be implemented in a number of different ways. For instance, the interface could be installed as another program on the computer 12, or on a database server that is associated with the database 14. Alternatively, it could be incorporated into the programs 10 themselves, or any other program that is resident on any of these devices, or another device. The features of the invention reside in the manner in which database statements are automatically generated, irrespective of where that functionality may reside.

It will be appreciated that the present invention can be embodied in other forms without departing from the spirit or essential characteristics thereof. The presently disclosed embodiments are considered to be illustrative and not restrictive. The scope of the invention is indicated by the appended claims, rather than the foregoing description, and all changes which come within the range of equivalents thereof are intended to be embraced therein.

What is claimed is:

1. A data model for a database having at least one table containing a plurality of fields, comprising a first class of objects which correspond to tables in the database, a second class of objects which correspond to fields in the tables, and at least one additional class of object which encapsulates said first and second classes of objects and provides a layer of abstraction between programs external to the database and the structure of the database.

2. The data model of claim 1, wherein at least one type of object in said model contains information which identifies a parent/child relationship between a component to which said one type of object corresponds and another component that corresponds to another object of said one type.

3. The data model of claim 2, wherein said one object and said other object respectively correspond to different tables in the database.

4. A data model for a database, comprising a plurality of different classes of objects which respectively correspond to different types of components of said database, and at least one additional class of object which encapsulates the other classes of objects and provides a layer of abstraction between programs external to the database and the objects that correspond to said components, wherein at least one type of object in said model contains information which identifies a relationship between a component to which said one type of object corresponds and another component that corresponds to another object of said one type.

5. The data model of claim 4, wherein said database comprises at least one table containing a plurality of fields, and said model comprises a first class of objects which correspond to tables in the database, and a second class of objects which correspond to fields in the tables.

6. The data model of claim 4, wherein said one object and said other object respectively correspond to different tables in the database.

7. A method for providing an interface between a database having at least one table containing a plurality of files and programs external to the database, comprising the steps of:

establishing a model that comprises a first class of objects which correspond to tables in said database, a second class of objects which correspond to fields in the tables, and a third class of object which encapsulates the first and second classes of objects and provides a layer of abstraction between programs external to the database and the structure of the database;

receiving a request at said third class of object which identifies data that is to be accessed in the database; and invoking objects in at least one of said other classes to construct a command to retrieve data from the database components to which they correspond.

8. The method of claim 7, wherein at least one type of object in said model contains information which identifies a parent/child relationship between a component to which said one type of object corresponds and another component that corresponds to another object of said one type.

9. The method of claim 8, wherein said one object and said other object respectively correspond to different tables in the database.

10. A data model for a database of the type comprising a plurality of tables each having at least one field, said data model comprising a hierarchy of object classes including the following:

a first level of objects that respectively correspond to the fields in said tables and provide information about the corresponding fields;

a second level of objects that are respectively associated with the tables in said database, wherein any given object in said second level is linked to objects in said first level that correspond to fields contained in the table with which said given object is associated, and constructs a command to access data in said table in accordance with the information provided by objects in said first level; and a third level of object that encapsulates objects at said second level and functions as an interface to receive requests from applications and invoke objects at said second level to construct commands to access data pertaining to said requests.

11. The data model of claim 10, comprising a plurality of objects at said third level, each of which encapsulates a different set of objects at said second level.

12. The data model of claim 10, wherein at least one object at said second level includes an attribute that identifies other objects at said second level whose associated tables have a parent-child relationship to the table associated with said one object.

13. The data model of claim 12, wherein in response to an invokation from an object at said third level, said one object at said second level directly accesses a related object at said second level to respond to a request, in accordance with said attribute.

* * * * *